(12) United States Patent
Velagapudi et al.

(10) Patent No.: US 11,645,456 B2
(45) Date of Patent: May 9, 2023

(54) SIAMESE NEURAL NETWORKS FOR FLAGGING TRAINING DATA IN TEXT-BASED MACHINE LEARNING

(71) Applicant: Microsoft Technology Licensing, LLC

(72) Inventors: Nishant Velagapudi, Seattle, WA (US); Zhengwen Zhu, Redmond, WA (US); Venkatasatya Premnath Ayyalasomayajula, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 477 days.

(21) Appl. No.: 16/775,162

(22) Filed: Jan. 28, 2020

(65) Prior Publication Data

US 2021/0232911 A1 Jul. 29, 2021

(51) Int. Cl.
*G06F 40/20* (2020.01)
*G06N 20/00* (2019.01)
(Continued)

(52) U.S. Cl.
CPC .......... *G06F 40/20* (2020.01); *G06N 3/0445* (2013.01)

(58) Field of Classification Search
CPC .......... G06N 20/00; G06N 3/08; G06F 40/20
See application file for complete search history.

(56) References Cited

U.S. PATENT DOCUMENTS

| 9,037,464 B1 * | 5/2015 | Mikolov | ............... G06F 40/30 704/255 |
| 10,303,978 B1 | 5/2019 | Kang et al. | |

(Continued)

FOREIGN PATENT DOCUMENTS

| WO | 2019002603 A1 | 1/2019 |
| WO | 2019186194 A2 | 10/2019 |

OTHER PUBLICATIONS

Zhang, Weining, and Xiaoyang Tan. "Combining outlier detection and reconstruction error minimization for label noise reduction." 2019 IEEE International Conference on Big Data and Smart Computing (BigComp). IEEE, 2019. (Year: 2019).*

(Continued)

*Primary Examiner* — Jialong He
(74) *Attorney, Agent, or Firm* — NovoTechIP International PLLC

(57) ABSTRACT

Techniques performed by a data processing system for analyzing training data for a machine learning model and identifying outliers in the training data herein include obtaining training data for the model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements. Processing may include deleting the outlier data elements or generating a report.

13 Claims, 11 Drawing Sheets

(51) Int. Cl.
*G06N 3/08* (2006.01)
*G06N 3/04* (2023.01)

(56) References Cited

U.S. PATENT DOCUMENTS

| | | | |
|---|---|---|---|
| 2015/0193693 A1 | 7/2015 | Vasseur et al. | |
| 2017/0262635 A1 | 9/2017 | Strauss et al. | |
| 2019/0179891 A1* | 6/2019 | Rangarajan Sridhar | ..................... G06F 40/216 |
| 2019/0205794 A1* | 7/2019 | Hsu | ..................... G06F 16/285 |
| 2019/0310650 A1 | 10/2019 | Halder | |
| 2020/0202257 A1* | 6/2020 | Lee | ..................... G06K 9/6263 |

OTHER PUBLICATIONS

Smith, Michael R., and Tony Martinez. "Improving classification accuracy by identifying and removing instances that should be misclassified." The 2011 international joint conference on neural networks. IEEE, 2011. (Year: 2011).*

Huang, Jinchi, et al. "O2u-net: A simple noisy label detection approach for deep neural networks." Proceedings of the IEEE/CVF International Conference on Computer Vision. 2019. (Year: 2019).*

Hendrycks, et al., "Deep Anomaly Detection with Outlier Exposure", In Proceedings of 7th International Conference on Learning Representations, May 6, 2019, pp. 1-18.

Kumar, Ajitesh, "Machine Learning: Validation Techniques", Retrieved from: https://dzone.com/articles/machine-learning-validation-techniques, Feb. 12, 2018, 5 Pages.

Madani, et al., "Co-Validation: Using Model Disagreement on Unlabeled Data to Validate Classification Algorithms", In Journal of Advances in Neural Information Processing Systems, Dec. 13, 2004, 8 Pages.

Mierswa, Ingo, "Learn the Right Way to Validate Models, Part 1: Training Error & Test Error", Retrieved from: https://rapidminer.com/blog/validate-models-training-test-error/, Jan. 3, 2017, 3 Pages.

Khuarana, Prerna, "Hybrid BiLSTM-Siamese Network for FAQ Assistance", In Proceedings of the ACM on Conference on Information and Knowledge Management, Nov. 6, 2017, pp. 537-545.

"International Search Report and Written Opinion Issued in PCT Application No. PCT/US2020/066732", dated Apr. 30, 2021, 12 Pages.

Speth, Jeremy, "Automated Label Noise Identification for Facial Attribute Recognition", Retrieved From: https://openaccess.thecvf.com/content_CVPRW_2019/papers/Uncertainty%20and%20Robustness%20in%20Deep%20Visual%20Learning/Speth_Automated_Label_Noise_Identification_for_Facial_Attribute_Recognition_CVPRW_2019_paper.pdf, Jan. 1, 2019, pp. 25-28.

Wang, et al., "Iterative Learning with Open-set Noisy Labels", In Proceedings of the IEEE Conference on Computer Vision and Pattern Recognition, Jun. 18, 2018, pp. 8688-8696.

* cited by examiner

FIG. 8

| 805 | 810 | 815 | 820 | 825 | 830 | 835 | 840 | 845 |
|---|---|---|---|---|---|---|---|---|
| 346 | 0.1624 | 0.0375 | 221 | 0.2012 | 0.0398 | 0.0388 | -0.9743 | why i can't get email from conversations from pinterest looking for all conversations from kijiji in |
| 389 | 0.1638 | 0.0364 | 221 | 0.2012 | 0.0398 | 0.0374 | -0.9392 | regards to ***** Toyota Corolla |
| 382 | 0.1681 | 0.0378 | 221 | 0.2012 | 0.0398 | 0.0352 | -0.8329 | I lost my last message i accidentally deleted or send to spam i really need the it please |
| 394 | 0.1685 | 0.0385 | 221 | 0.2012 | 0.0398 | 0.0328 | -0.8224 | i accidentally spammed tickets for a concert tomorrow and incant find it |

800

SIAMESE NEURAL NETWORKS FOR FLAGGING TRAINING DATA IN TEXT-BASED MACHINE LEARNING

BACKGROUND

Text-based machine learning is becoming increasingly common as support and other front-line customer interactions become increasingly common. Chat-bots, sentiment analysis, and information retrieval are just a few of example applications of text-based machine learning. As these systems become increasing ubiquitous to solve business problems, the requisite scale of training data collection and maintenance poses an increasing challenge. Providing just a small amount of human-reviewed data is time consuming and difficult. Machine learning applications may require hundreds of thousands to millions of pieces of data to train a model for deep learning approaches.

Human production of the training data is often unreliable. Human reviewers make mistakes. Furthermore, the workers tasked with data labeling may not be familiar with machine learning and may mislabel some of the training data. Outsourcing of the data labeling may reduce costs but sacrifice data quality. The workers producing the training data may lack the critical domain knowledge needed to produce good training data and are also likely to make errors in labeling training data. Automated processes may also be used to generate the training data with minimal human review, but such automated processes often mislabel the data. Thus, there are significant areas for new and approved mechanisms for post processing review of training data for machine learning applications that can provide better training data.

SUMMARY

An example data processing system according to the disclosure may include a processor and a computer-readable medium storing executable instructions. The executable instructions include instructions configured to cause the processor to perform the operations of obtaining training data for a machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

An example method performed by a data processing system for analyzing training data for a machine learning model includes: obtaining the training data for the machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

An example memory device according to the disclosure stores instructions that, when executed on a processor of a data processing system, cause the data processing system to analyze training data for a machine learning model, by: obtaining the training data for a machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 8 is a diagram showing example scores resulting from the cross-similarity determinations discussed in FIG. 6.

DETAILED DESCRIPTION

Figure 1:
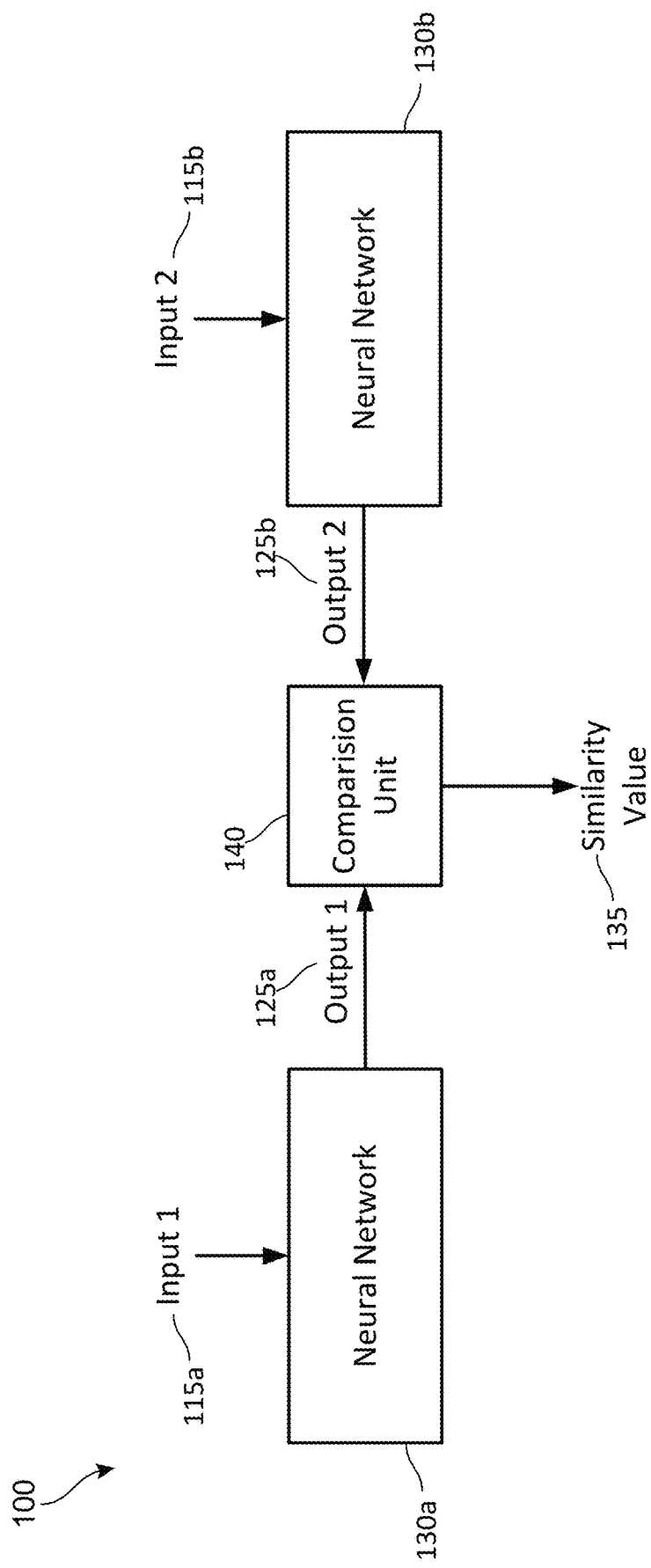
FIG. 1 is a block diagram illustrating an example of a computing environment in which an example Siamese Neural Network (SNN) has been implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Techniques for performing post-processing review of training data for machine learning models are provided. These techniques solve the technical problem of how to automatically and accurately detect outliers in machine learning training data sets. Outliers are training data elements that diverge significantly from an overall pattern on a sample. In a text classification system, an outlier may be a textual data element that has been misclassified as belong to one class when the data element may be more closely related to data elements of another class. Such outliers can result in less accurate machine learning models by skewing and misleading the learning algorithms during the training process.

Outliers such as these may be difficult, if not impossible, for human reviewers to identify. This is particularly true for large training data sets which may include many thousands if not millions of data elements. The techniques disclosed herein help solve this technical problem by identifying outlier data elements in the training data and flagging these data elements for manual review using a neural network. A technical benefit of this approach is that it may significantly decrease the amount of training data that may need to be reviewed, deleted, or modified by a human reviewer. Another technical benefit is that the resulting machine learning models may be more accurate because the neural networks used to identify the training data utilize embeddings that are based on historical textual data that is domain specific. The historical data represents actual textual content, such as chats, emails, transcripts, and/or other textual content that provides a representation of how language is used in that domain. For example, if a machine learning model is being developed for use in a software support domain, text-based historical data that includes communications from clients, support engineers, and/or other parties involved in the software support domain are used to provide content that illustrates how language is used in this domain. Word embeddings, which are quantitative representations of individual words, are trained using this historical data to provide the neural network with an understanding of domain specific language, which in turn helps the neural network to better understand training data for training machine learning models for use in that domain and to identify outliers within that training data. The flagged outliers may be presented human users for review to provide users with the ability to address potential problems in the training data before training a machine learning model with that data. In other implementations, the flagged outliers may be automatically removed from the training data, and a report may be generated that indicates which training data was removed from the set of training data due to being flagged as an outlier.

FIG. 1 is a block diagram illustrating an example computing environment in which a Siamese Neural Network (SNN) 100 has been implemented. The SNN 100 may be used to identify outliers in training data that may be used to train machine learning models. An SNN is a class of neural networks that includes two identical subnetworks, which have the same configuration and the same parameters and weights. In this example, SNN 100 includes subnetwork 130*a* and subnetwork 130*b*. The subnetwork 130*a* can operate on a first input 115*a* and the subnetwork 130*b* can operate on a second input 115*b*. The subnetworks 130*a* and 130*b* are configured to receive numerical vectors as inputs. The textual content of the first inputs 115*a* and the second input 115*b* can be converted from text to a vectorized representation using word embedding information trained using textual historical data associated with a domain for which the training data is to be assessed by the SNN 100. Word embedding will be discussed in greater detail in the examples that follow.

The subnetworks 130*a* and 130*b* may be implemented as various types of neural networks. In the examples that follow, the subnetworks 130*a* and 130*b* are implemented as a Bidirectional Long Short-Term Memory (BiLSTM) neural network. Other types of neural networks may be used to implement the subnetworks 130*a* and 130*b* in other implementations. The only constraints on the subnetworks 130*a* and 130*b* is that the subnetworks 130*a* and 130*b* must share the same network architecture and configuration so that they will output the same values if provided with the same input. Other types of sequential neural networks may be used to implement the neural networks of the SNN, such as but not limited to a convolutional neural network (CNN) or a Recurrent Neural Network (RNN).

The subnetwork 130*a* outputs a first output 125*a* based on the first input 115*a*, and the subnetwork 130*b* outputs a second output 125*b* based on the second input 115*b*. The first input 115*a* may be a first textual input from training data that is being evaluated for outliers using the SNN 100. The second input 115*b* may be second textual input from the training data. The text content of the first input 115*a* and the second text input 115*b* may be mapped to a numerical vector using embedding information derived from text-based historical data. The embedding used to convert the textual inputs to the corresponding vectors will be discussed in greater detail with respect to FIGS. 2-4 in the examples that follow.

The subnetwork 130*a* outputs a first output 125*a*, and the subnetwork 130*b* outputs a second output 125*b*. The outputs may comprise an output vector that includes numerical values representing various aspects of the output. The outputs may include a label of a class in which the subnetwork has determined that the input belongs.

The first output 125*a* and the second output 125*b* are provided as inputs to the comparator unit 140. The comparator unit 140 is configured to calculate a "distance" between the first output 125*a* and the second output 125*b* and to output this distance as the similarity value 135. The SNN 100 yields a small distance for similar inputs and a greater distance for inputs that are dissimilar. For example, if subnetworks determine that their respective inputs fall into the same class, the distance between the two inputs should be relatively small. The SNN 100 outputs this distance as the similarity value 145. The similarity value is a numerical value representing the distance between the first output 125a and the second output 125b.

The comparator 140 may be configured to determine the distance between the first output 125a and the second output 125b using various techniques that provide a numerical representation of the difference. In some implementation, the comparator unit 140 may be configured to determine and output as the similarity value 135 as a cosine difference between the vector values of first output 125a and the vector values of the second output 125b. The cosine distance may be calculated by the following equation:

Cosine Distance=1–Cosine Similarity, where the Cosine Similarity is determined using the following equation:

$$\text{Cosine Similarity} = \frac{\sum_{i=0}^{n} x_i y_i}{\sqrt{\sum_{i=0}^{n} x_i^2} \sqrt{\sum_{i=0}^{n} y_i^2}},$$

where the length of the vectors of the first and second outputs 125a and 125b are the integer value n, and $x_i$ represents the ith entry in the first output 125a and $y_i$ represents the ith entry in the second output 125b.

The SNN 100 must be trained before being used to compare data points in training data for machine learning models to identify data points that may be outliers. In some implementations, the SNN 100 may be trained with a bootstrapped or randomly selected subset of the training data that the SNN 100 may later be used to detect outliers in the training data as a whole. This subset of the training data is referred to herein as the SNN training data set. In some implementations, the SNN training data set may be created to include example data elements from each of the classes included in the training data.

Each data element in the training set may include a sample of similar data from the same output class and dissimilar data from different output classes. The similar data is used to train the SNN which data is like the data element, while the dissimilar data is used to train the SNN which data is unlike the data element. Each piece of data in the training set may be associated with one or more pieces of similar data from the same output class and one or more pieces of dissimilar data from one or more different output classes. In an example implementation to illustrate these concepts, each piece of training data is associated with one piece of similar training data from the same output class and four pieces of dissimilar data from one or more other output classes. For a root sample of N data points, where N is a positive integer, we now have 5*N data points to train the model. The ratio of 1:4 of similar to dissimilar data in this example is merely an example of how the training data may be selected for training the model. This example does not limit the SNN 100 to this particular ratio in the training data or to the specific number of similar and dissimilar data elements associated with each piece of data used to train the model. Other implementations may use a different ratio of similar to dissimilar data and/or number of similar and dissimilar data elements. The subnetworks of the SNN are trained using the SNN training data.

Figure 2:
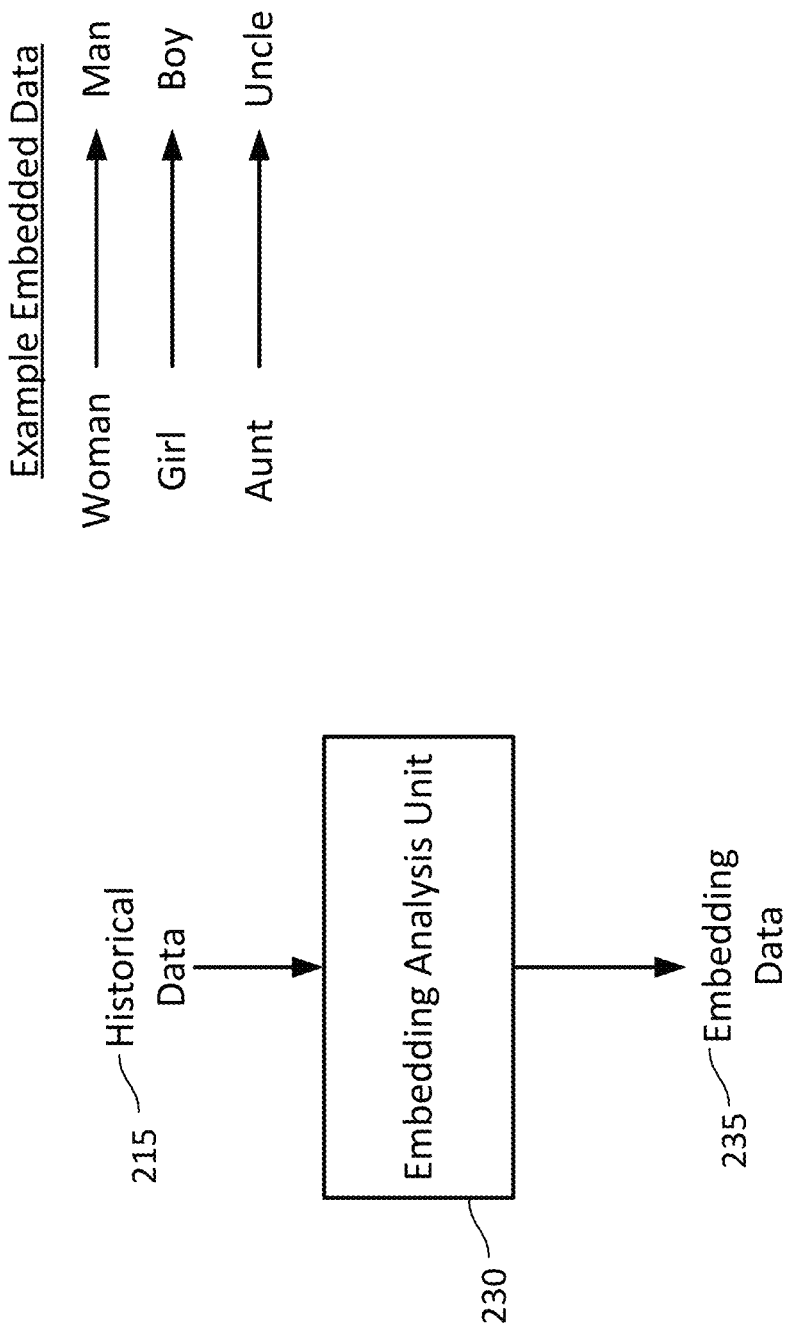
FIG. 2 illustrates a block diagram of an example of an embedding analysis unit that may be used to process historical data to determine relationships between words in the historical data and to output embedding data.

FIG. 2 illustrates a block diagram of an example of an embedding analysis unit 230 that may be used to process historical data 215 to produce embedding data 235. The embedding data 235 represents relationships between words in the historical data 215 and provide the SNN 100 with a domain-specific understanding of how language is being used within that domain. The historical data 215 may include textual content, such as text messages, emails, transcripts of meetings, phone calls, or other discussions, and/or other such text-based input. The historical data 215 can be used to determine a model of how language is being used in that domain, which in turn can be used to better understand textual inputs from training data to be analyzed by the SNN 100 for outliers.

Figure 3:
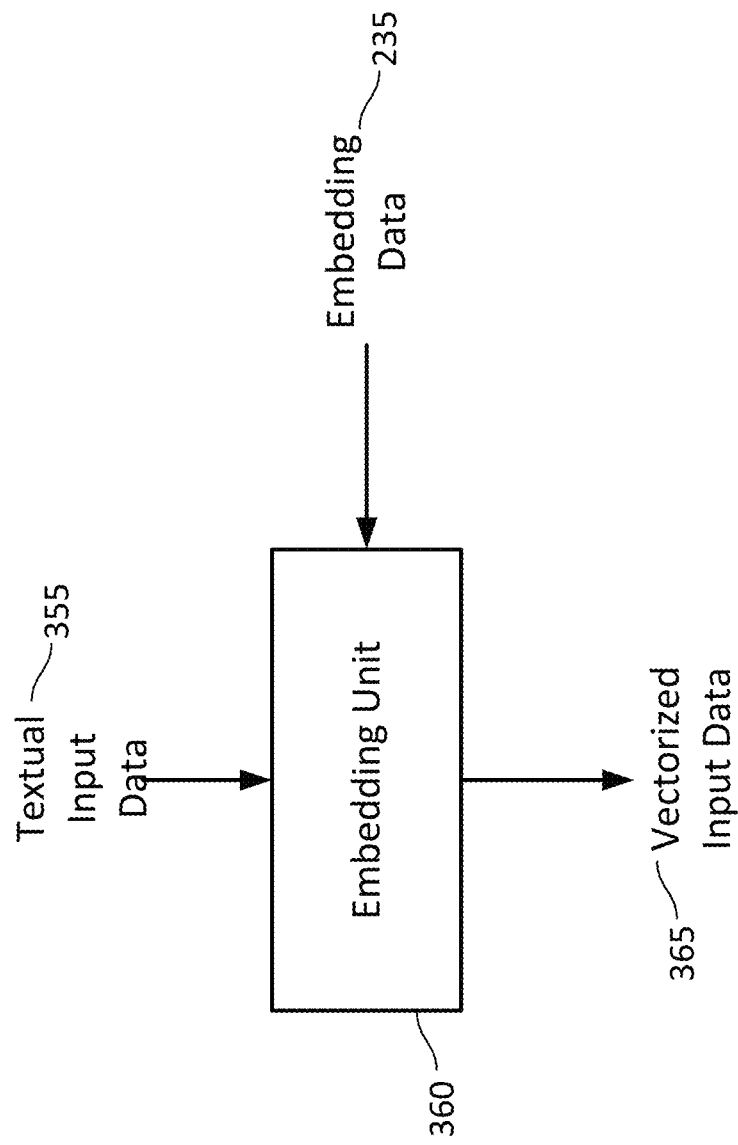
FIG. 3 is a diagram of an embedding unit configured to use the embedding data generated by the embedding analysis unit of FIG. 2 to generate vectorized input data from textual input data.

The embedding process may encode words received in a textual input, such as first input 115a and second input 115b, into a vector-based numerical representation of these textual inputs. The historical data 215 is analyzed to derive relationships between words included in the historical data based on their context of their use. The historical data may include, but is not limited to, email and/or other textual communications between team members, between team members and customers, documentation of processes and/or procedures implemented by an organization, and/or other such textual content that may be used to derive domain knowledge of typical communications that occur in the domain for which the machine learning models may be developed. The relationships may be quite different from domain to domain. For example, language used by a software support context may involve very different relationships The embedding analysis unit 230 is configured to analyze the corpus of historical data 215 and to generate embedding data 235. The embedding data 235 may be used by the SNN 100 to preprocess inputs to the subnetworks 130a and 130b to convert the textual input into a set of numerical vectors representing the textual input. FIG. 3, which will be discussed in detail in the examples that follow, illustrates an example of a textual input being converted into a set of numerical vectors representing the textual input. The embedding data 235 may provide a mapping between words or phrases included in the textual input and a vector representing that word or phrase. The embedding data 235 can be used to translate textual content to be provided the SNN 100 from a text string to a series of vectors representing that textual input. The vectors consist of numerical values that represent the word or phrase being replaced by the vector. The numerical values included in the vector encode contextual information that was extracted from the historical data 215 used to generate the embedding data 235. For example, two words that are closely related will have similar numerical values in their respective vector representations, while two words that are not closely related will have very different numerical values in their respective vector representations.

The embedding analysis unit 230 may be configured to use various techniques for analyzing the historical data 215 to produce the embedding data 235. The embedding analysis unit 230 may utilize Word2vec, which is a group of models that may be used to produce word embeddings. The Word2vec models are two-layer neural networks that are trained to reconstruct linguistic contents of words. Word2vec receives a corpus of text as an input and outputs a vector space. The word vector of words that share a common context are placed closer to one another in the vector space. The embedding analysis unit 230 may utilize another model referred to a GloVe, which is a model for distributed word representation. The model uses unsupervised learning to obtain vector representations for words. The words are mapped into a vector space in which the distance between words is related to semantic similarity. The embedding analysis unit 230 may use yet another model, fastText, which provides for supervised or unsupervised learning for creating vector representations of text input. The techniques disclosed herein are not limited to these three example models. Other unsupervised and/or supervised techniques may be implemented by the embedding analysis unit 230 to generate embedding data 235 from the historical data 215.

The various embedding techniques may provide means for encoding the historical data 215 without requiring that the encoding be specified manually. Each embedding is a dense vector of floating-point values. The length of the vectors may be specified. Longer vectors mean that the embedding process may capture more fine-grained relationships at the expense of the additional processing time, training data, and data storage capacity.

FIG. 3 is a diagram of an embedding unit 360 that is configured to use the embedding data 235 generated by the embedding analysis unit 230 to generate vectorized input data 365 from textual input data 355. The textual input data 355 may be a textual input to the SNN 100, such as the first input 115a and the second input 115b. The embedding unit 360 converts the textual input to a vector representation of that textual input by first tokenizing the textual input by dividing the textual input up into separate words. Each word is the mapped to a corresponding vector associated with that word in the embedding data 235. If a word included in the textual input is not included in the embedding data 235, the embedding analysis unit 230 may be configured to output a vector having all zero values or some other default values for that particular word.

Figure 4:
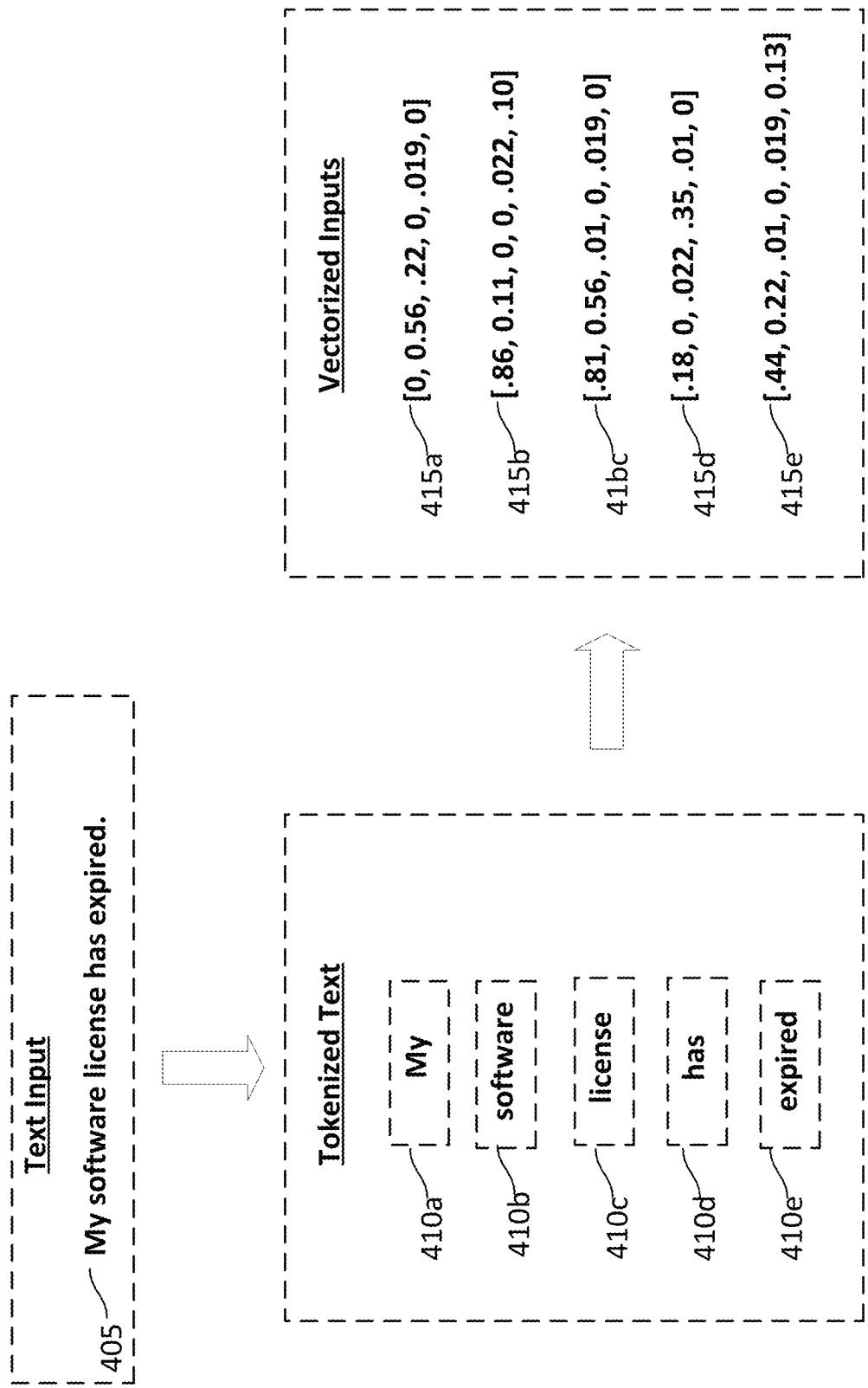
FIG. 4 is a diagram that illustrates an example of the vectorization of a textual input.

FIG. 4 is a diagram that illustrates an example of the vectorization of a textual input. The text input 405 includes the text "My software license has expired." The text input 405 is tokenized into a vector of words 410a-410e. The order of the words from the textual input is maintained because the SNN 100 can use the order of the words in the textual input to derive contextual information that can be used to classify the input text. The embedding analysis unit 230 searches the embedding data 235 is searched to determine whether the embedding data 235 includes a mapping of that word to a corresponding vector. The words 410a-410e are found in the embedding data 235 in this example, and the corresponding vectors 415a-415e are produced. The vectorized inputs 415a-415e may then be provided as a series of inputs to the subnetwork 130a of the SNN 100. A second text input (not shown) to be compared the first input 405 may be vectorized in a similar manner to produce a second set of vectorized inputs (not shown) that may be provided a series of inputs to the subnetwork 130b of the SNN 100. The two inputs may have different lengths, and thus, may output a set of vectorized inputs having different numbers of vectorized inputs. However, the lengths of the individual vectorized inputs will each have the same length.

Figure 5:
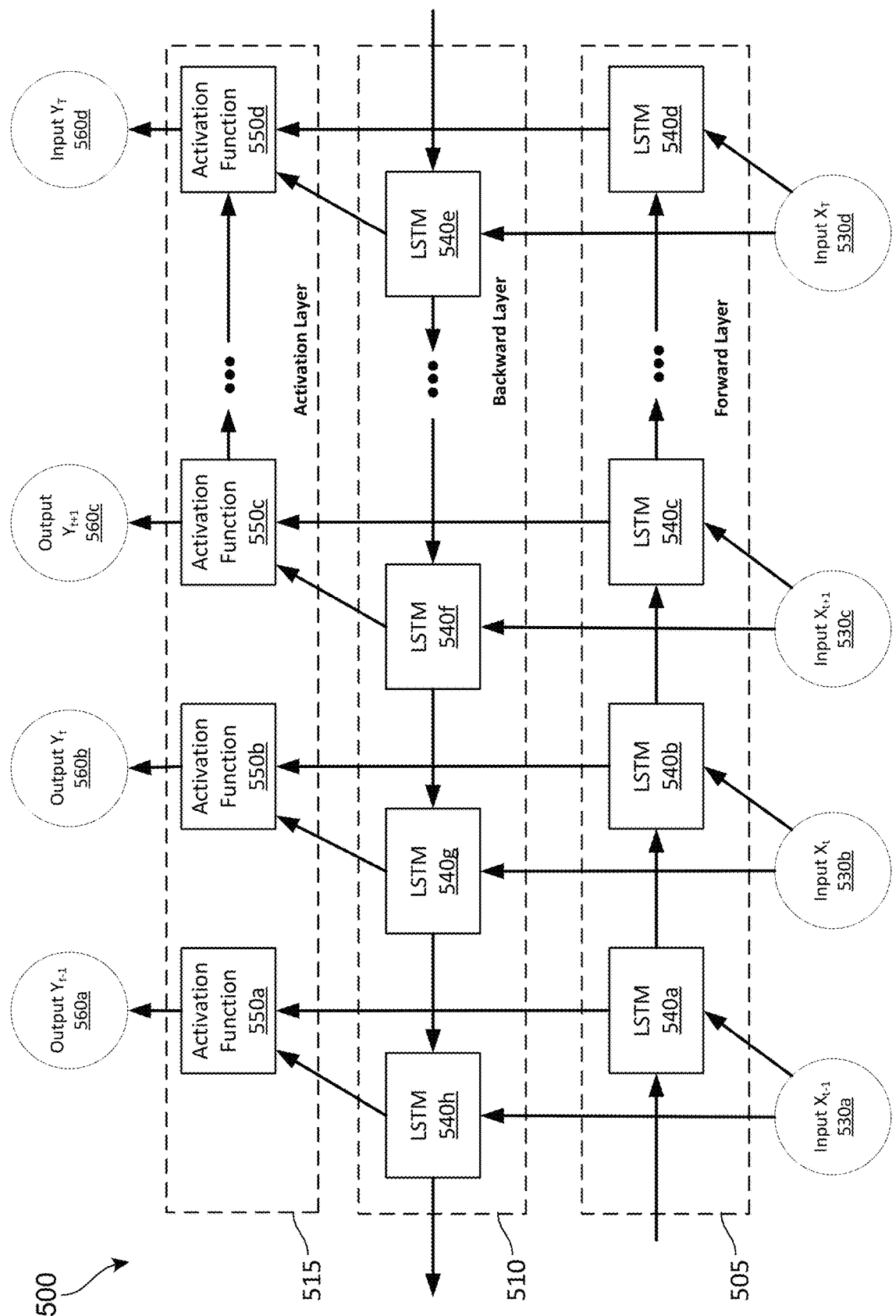
FIG. 5 illustrates an example of a neural network 500 that may be used to implement the neural networks 130a and 130b of the SNN 100.

FIG. 5 illustrates and example of a neural network 500 that may be used to implement the neural networks 130a and 130b of the SNN 100. The example illustrated in FIG. 5 is an example of one type of network architecture that may be used to map from an input to output representation. However, the SNN 100 is not limited to this particular architecture, and other types of network architectures may be used in other implementations of the SNN 100.

The neural network 500 is an example of a Bidirectional Recurrent Neural Network with Long-Short Term Memory cells. This architecture is referred to as "BiLSTM" herein. Recurrent neural networks, such as the neural network 500, are primarily used for time-distributed inputs. The neural network 500 includes LSTM cells 540a-540h. Each LSTM cells sequentially consume each input for processing. The LSMT cells pass cell state information on to the next cell in the sequence. Each cell has the ability add or remove information from the cell state information.

The neural network 500 include a forward layer 505, and backward layer 510, and an activation layer 515. The forward layer 505 and the backward layer 510 process input data forward and backward in parallel. Oftentimes the concept of a sentence is not forward linear or backward linear. By processing the sentence in both directions, a little more of an understanding of the sentence may be understood.

The neural network 500 receives a series of inputs 530a-530d in this example. Each input may be a vectorized word or phrase from a text input to be processed by the neural network 500. The vectorized work or phrases may be produced from the text input using the techniques disclosed in the proceed examples. In some implementations, the textual input to be processed by the neural network 500 may be tokenized and each of the words of the textual input may be provided as an input 530a-530d. The embedding unit 360 may implement an embedding layer that is disposed between the inputs 530a-530d and the LSTM cells 540a-540h of the forward layer 505 and the backward layer 510.

Each input of the inputs 530a-530d is provided to one LSTM cell of the forward layer 505 and one LSTM cell of the backward layer 510 for processing. In the example neural network 500, the input 530a is provided as an input to LSTM cells 540a and 540h. LSTM cell 540a outputs cell state information to LSTM cell 540b and a first output value to the activation function 550a. LSTM cell 540h outputs cell state information to the next LSTM cell in the backward layer 510 (if any) and a second output value to the activation function 550a. The activation function 550a determines the output 560a based on the inputs received. Each of the activation functions 550a-550d determines a respective one of the outputs 560a-560d. The outputs 550a-550d provide a mathematical representation of the text input to the neural network 500. In the SNN 100, this mathematical representation of the text input can be compared with a mathematical representation determined by the neural network 500 for a second text input to determine a distance between the two inputs.

Figure 6:
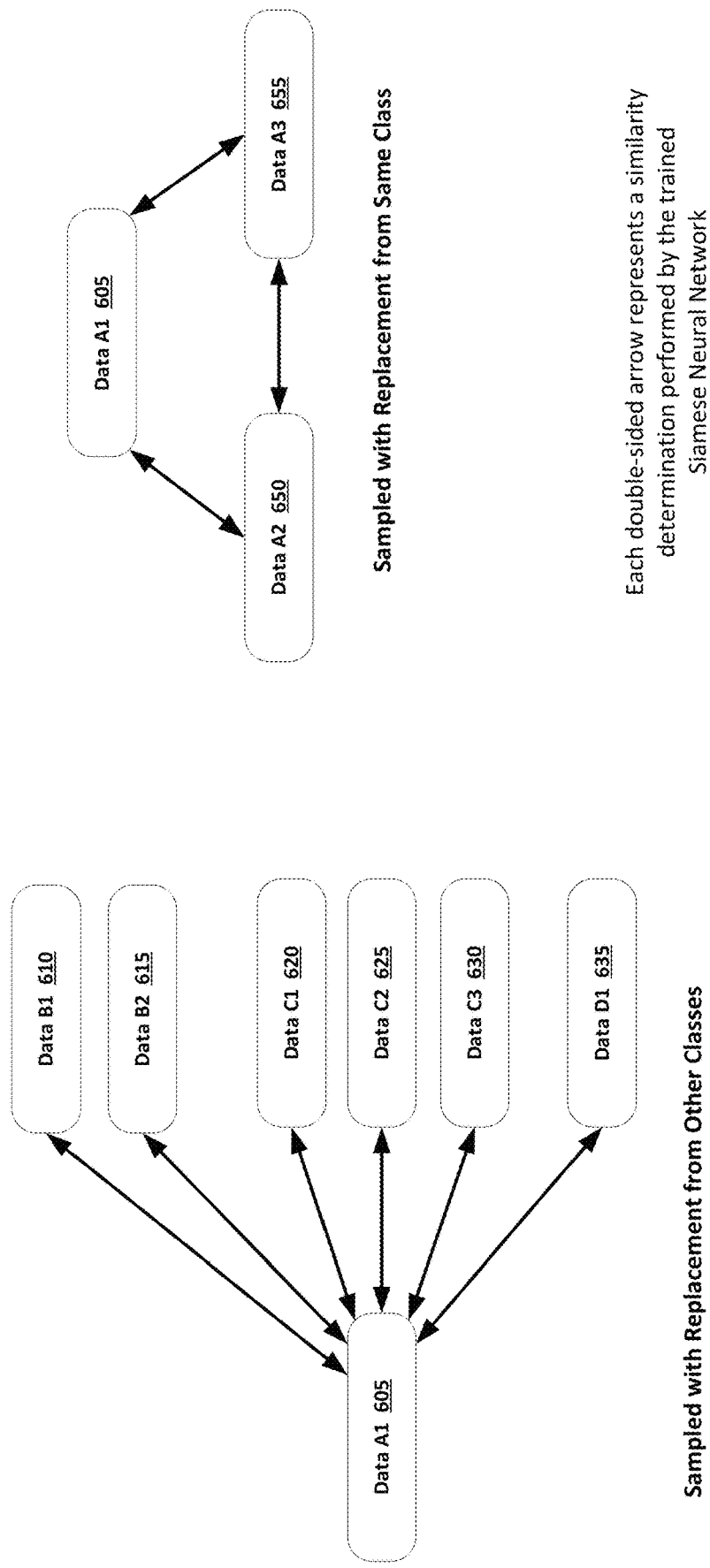
FIG. 6 is a diagram that illustrates an example set of cross-similarity determinations that may be performed using the SNN to identify unusual training data in a set of training date.

FIG. 6 is a diagram that illustrates an example set of cross-similarity determinations 600 that may be performed using the SNN 100 to identify unusual training data. The SNN 100 has been trained on domain-specific text related to the machine learning application for which the training data is to be analyzed. The SNN 100 consumes two textual inputs and outputs a quantification of similarity between the two textual inputs. The cross-similarity calculations 600 illustrate an example of how the SNN 100 can be used to flag usual training data. Using these techniques to identify usual training data can accurately identify training data that may have been mislabeled and require human attention to correct.

The cross-similarity determinations 600 illustrated in FIG. 6 include two types of cross-determinations: within-label cross-determinations and outside-label cross-determinations. The cross-similarity determinations 600 illustrated in FIG. 6 are being performed on a piece of training data element 605. The training data element 605 is currently associated with a class "A" in the training data. The within-label cross-determinations and the outside-label cross-determinations can be used to determine whether data element 605 may have been improperly labeled and may be more closely associated with another class.

The within-label cross-determinations use the SNN 100 to perform similarity determinations between the training data element 605 and other training data elements that are associated with the same class. In this example, two other training data elements 650 and 655 from class A are compared with training data element 605 and with each other. According to this example, the following pairs of data elements are passed to the SNN 100 to obtain a similarity determination: (1) data element 605 and data element 650, (2) data element 605 and data element 655, and (3) data element 650 and data element 655. The similarity scores associated with the within-label determinations can be used to determine whether the data element 605 is an in-class outlier. An in-class outlier is a data element that has been classified in one class but should more likely be associated with a different class. The SNN 100 can flag the training data associated with data element 605 for review by a human operator. The training data may need to be manually adjusted by a user to remove and/or reclassify the data element 605. A first average distance between all or a subset of the class members may also be calculated. A second average distance between the data element 605 and the other class members may be calculated. The first average distance represents the average distance between element of the class as a whole, while the second average distance represents an average distance between the data element 605 and other data elements in the class.

The outside-label cross-determinations use the SNN 100 to perform similarity determinations between the training data element 605 and selected training data elements from other classes. The outside-label data elements may be bootstrapped or randomly sampled from a set of outside-label classes. The term "outside-label classes" refers to other classes that are included in the training data other than the class with which the training data element 605 is associated. In some implementations, both the outside-label classes and the data elements selected therefrom may be randomly selected. In other implementations, one or more data elements from each of the outside-label classes may be randomly selected.

In the example illustrated in FIG. 6, similarity determinations are performed between the data element 605 and data elements from three other classes: class B, class C, and class D. Two data elements from class B have been selected, data elements 610 and 615. Three data elements from class C have been selected, data elements 620, 635, and 630. One data element from class D has been selected, data element 635. Similarity determinations are performed between each of these outside-class data elements and the data element 605. These outside-label cross-determinations can be used to determine whether the data element 605 more closely aligns with one of these other classes than class A with which the data element 605 is currently associated.

The within-label cross-determinations and the outside-label cross-determinations may then be analyzed. Comparison of the aggregation of the within-label cross-similarities to aggregation of the outside-label cross-similarities quantifies how well a piece of data "belongs" to that label versus other labels. More within-label samples for similarities increases the robustness of the similarity calculation to internal outliers, while more external samples for similarities increases the ability of the SNN to deduce where the piece of input data belongs based on language usage. Increasing the number of samples also increases the number of comparisons that will need to be performed. The amount of data to be used in the comparisons may be configurable to allow the user to balance the thoroughness of the inference at scoring time with operational concerns, such as the amount of time and processing resources that will be required to analyze the data. The within-label cross-determinations and the outside-label cross-determinations may be performed for each piece of training data that is included in the set of training data to be analyzed.

Once the within-label cross-determinations and the outside-label cross-determinations have been determined, the pieces of training data may be ranked. Training data on average very distant from other data belonging to the same label are flagged for human review. The within-label similarity average and standard deviation are used as sample statistics to characterize expected behavior. Labels found to have a high average distance are generally considered to be non-specific, while labels found to have a high standard deviation are considered to have poorly defined data.

FIG. 8 is a diagram illustrating example scores resulting from the cross-similarity determinations discussed in FIG. 6. The diagram includes table 800 of data for a plurality of data elements from the training data. The examples included in the table 800 have been flagged as being potentially bad training data for the label within which they are associated. In this example, the label ID 221 is meant be associated with questions on how to use the search function in Microsoft Outlook. The cross-similarity determination data associated with each of these entries that these data samples are irrelevant and verbose.

The column 805 includes an identifier for the data element. The column 810 includes a value representing a similarity of the data element to other data elements labeled as the same class. The column 815 includes a value that represents a variation within the similarity. The variation may be calculated as the standard deviation of the within-label cross-similarity values of column 805. The column 820 includes the label ID of the class with which the data element is currently associated.

The column 825 includes a value that represents the average cross-similarity within the label. The average cross-similarity within the label can be determined by averaging cross-similarity values determined for pairs of data elements selected from the class. The column 830 includes the variance of the cross-similarity values. The variance can be determined by subtracting the average from column 825 from the cross-similarity values associated with each pair of data points, squaring the differences, and the adding up the squared differences. Then divide the sum by the number of cross-similarity values included in the calculation minus one (e.g., sum/(N−1), where N=the number of cross-similarity values included in the calculation). Column 835 includes a value that represents the difference between the data similarity (column 810) and the average label similarity (column 825). Column 840 includes a value that represents the difference (column 835) normalized by the variance (column 830). Column 845 includes the input text associated with the data element.

Data that is less similar to other within-label data than expected may be flagged for review. A determination whether to flag a particular data element can be made by determining a difference between the data element's similarity to the rest of the class (column 810) and the average within-label similarity (column 815). The difference may then be normalized by the expected variance observed in the bucket. The resulting score (column 840) encapsulates how similar the data is to other within-label compared to the expected similarity within that label, contextualized by the observed variance within that label (column 830). The data elements may be ranked by score in column 840 from greatest to smallest, where a higher score indicates that the data element may be an outlier.

The resulting scores may be dependent at least in part how good the training data is for a particular label. Good training data may only have minor outliers, and thus, the threshold score for identifying an outlier may be much lower than in scenarios that include poorer quality training data. Poorer quality training data may include data that is not well associated with its labels, and thus, the threshold score for identifying an outlier may be much higher than in scenarios where the training data is of better quality. Therefore, in some implementations, any data elements for which there is a non-zero score in column 840 may be flagged for review and included in a report, and the reviewer may elect to ignore those elements having a score less than a threshold value. The report can rank the data elements with the highest score first, so that these elements appear earlier in the report presented to the user. In some implementations, the training data management unit 705 may provide a user interface that renders the report on a display of the user's computing device. This user interface may permit the user to customize the report by entering a threshold score value, and the user interface may restrict the data elements displayed in the report those having at least the threshold difference value in column 840.

Figure 7:
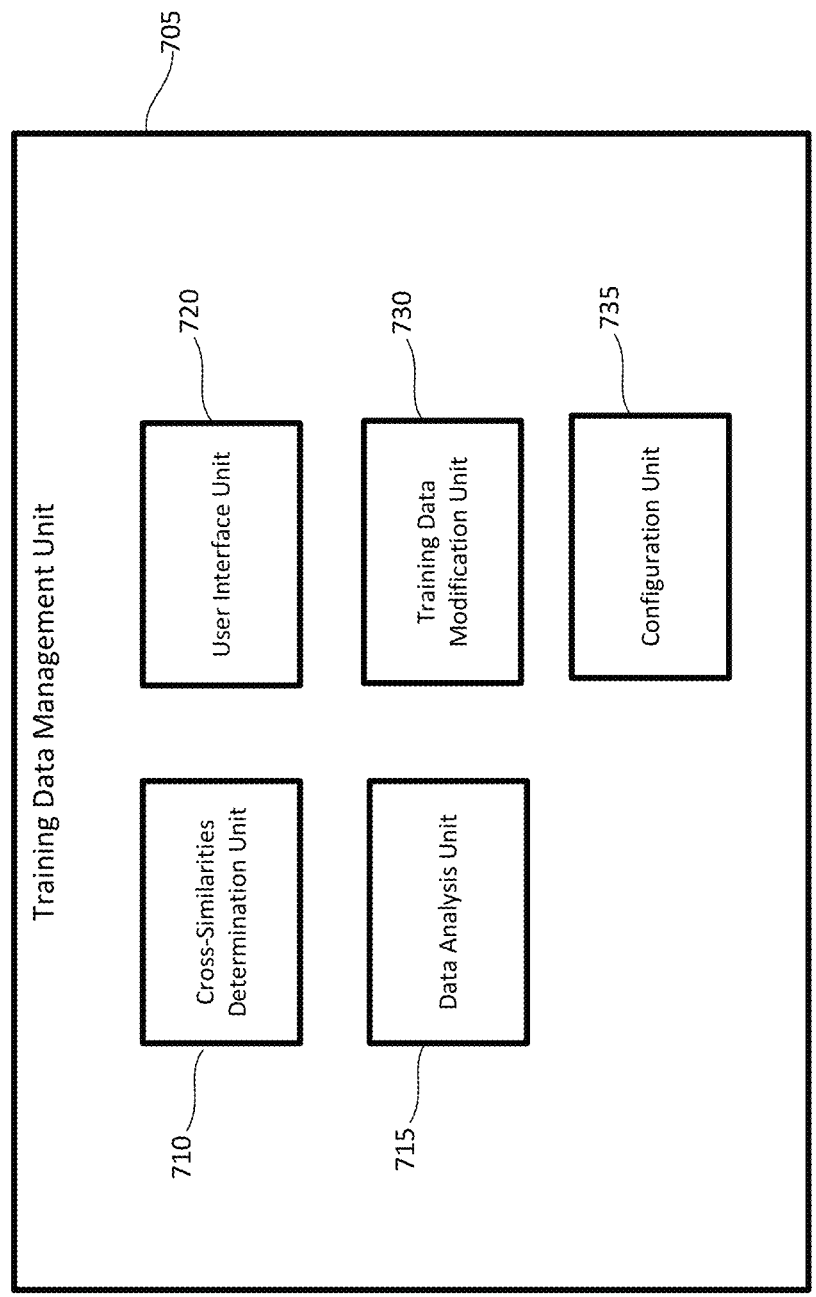
FIG. 7 is a diagram of an example training data management unit that may be implemented by a data processing system to perform various operations for analyzing training data for a machine learning model.

FIG. 7 is a diagram of an example training data management unit 705. The training data management unit 705 may be configured to perform various operations described in the preceding examples related to identifying training data that may be mislabeled. The training data management unit 705 can be implemented by processor-executable program code, hardware, or a combination thereof, and may be implemented by the example software architecture 1000 of FIG. 10 and/or the example computing device 1100 illustrated in FIG. 11. The training data management unit 705 may include a cross-similarities determination unit 710, a data analysis unit 715, a user interface unit 720, and a training data modification unit 730, and configuration unit 735.

The cross-similarities determination unit 710 may be configured to perform the cross-similarities determinations described at least in FIG. 6 to determine whether data elements of training data have been correctly labeled or may more accurately belong to a different class. The cross-similarities determination unit 710 can rank the data elements such that data elements that are the least similar to their own class and/or more similar to another class higher. The higher ranked data elements may be outliers that require the training data for those data elements to be adjusted.

The data analysis unit 715 may implement the SNN 100 and the elements thereof illustrated in the previous examples. The cross-similarities determination unit 710 may provide data elements to be tested for similarity to the data analysis unit 715, and the data analysis unit 715 may provide the results of the similarity comparison to the cross-similarities determination unit 710.

The user interface unit 720 may provide a user interface that may be rendered on a display of a computing device. The user interface may provide a means for the user to select a set of training data to be analyzed by the training data management unit 705. The user interface may also provide a means for rendering the contents on a display of the computing device to allow the user to browse through and/or edit the training data. The user interface may also provide means for rendering the results of the analysis of the training data as a list or table of training data ranked based on the results of the cross-similarities determinations performed by the cross-similarities determination unit 710.

The training data modification unit 730 may permit the user to save changes to the training data that the user has editing via the user interface provided by the user interface unit 720. The training data modification unit 730 may receive edits to the training data via the user interface and provide those edits to the training data modification unit 730. The training data modification unit 730 may then save those changes to a copy of the training data stored in a memory of the computing device. The stored training data may be used to train a machine learning model. In some implementations, the training data modification unit 730 may perform automatic data cleanup based on the output of the data analysis unit 715 to remove outliers from the training data.

The configuration unit 735 may be configured to allow the user to provide historical data to configure the embedding used by the SNN 100 and may also be configured allow the user to provide SNN training data that may be used to train the neural networks of the SNN 100. The configuration unit 735 may also be configured to allow the user to reset the embedding and/or the neural networks of the SNN 100 to a default state. The user may wish to retrain the embedding and/or neural networks when switching from analyzing training data associated from a first domain to analyzing training data associated with a second domain.

Figure 9:
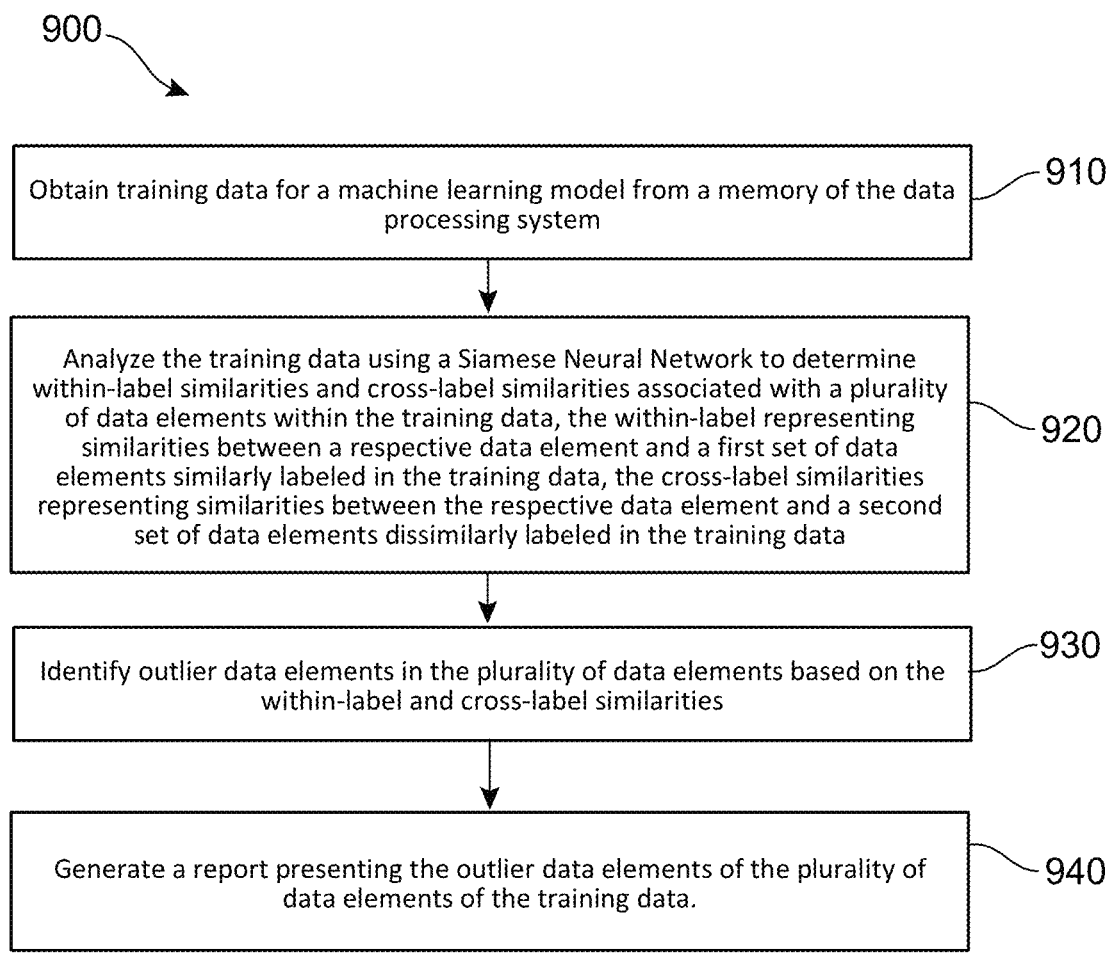
FIG. 9 is a flow chart illustrating an implementation of an example process executed by a data processing system for analyzing training data for a machine learning model.

FIG. 9 is a flow chart illustrating an implementation of an example process 900 executed by a data processing system for analyzing training data for a machine learning model and identifying outliers in the training data. The process 900 may be implemented by the training data management unit 705 and/or the SNN 100 illustrated in the preceding examples. The process 900 may be implemented by a data processing system similar to the data processing system 1100 of FIG. 11.

The process 900 may include an operation 910 of obtaining training data for a machine learning model from a memory of the data processing system. As discussed in the preceding examples, training data for training a machine learning model may be analyzed using the techniques disclosed herein to identify outliers in the training data that may reduce the accuracy of the model resulting from the training data. The training data may be stored in a persistent memory of the computing device and the stored training data may be accessed in order to analyze the training data.

The process 900 may include an operation 920 of analyzing the training data using a Siamese Neural Network to determine within-label similarities and cross-label similarities associated with a plurality of data elements within the training data. The within-label represent similarities between a respective data element and a first set of data elements similarly labeled in the training data, and the cross-label similarities represent similarities between the respective data element and a second set of data elements dissimilarly labeled in the training data. The within-label similarities and the cross-label similarities may be determined using the SNN 100 according to the preceding examples.

The process 900 may include an operation 930 of identifying outlier data elements in the plurality of data elements based on the within-label and cross-label similarities. As discussed in the preceding examples, if a data element is too dissimilar to the within-label data objection and is more similar to cross-label data elements associated with another label, the data element is likely to be an outlier in the training data that should be corrected in order to provide better training data for generating a more accurate data model.

The process 900 may include an operation 940 of processing the training data comprising the outlier data elements. Processing the outlier data elements may include generating a report presenting the outlier data elements of the plurality of data element of the training data. As discussed in the preceding examples, a report may be generated that identifies outlier data elements included in the training data. In some implementations, the report may be displayed on a display device of the data processing system. In other implementations, the report may be transmitted to another data processing system over a network for presentation to a user. The report may include information similar to the example table 800 illustrated in FIG. 8. In some implementations, processing the outlier data elements may automatically clean up the training data by deleting the data elements identified as outliers. In some implementations, only the outliers associated with a difference value in column 840 greater than a threshold value may be deleted.

The detailed examples of systems, devices, and techniques described in connection with FIGS. 1-9 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-9 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 10:
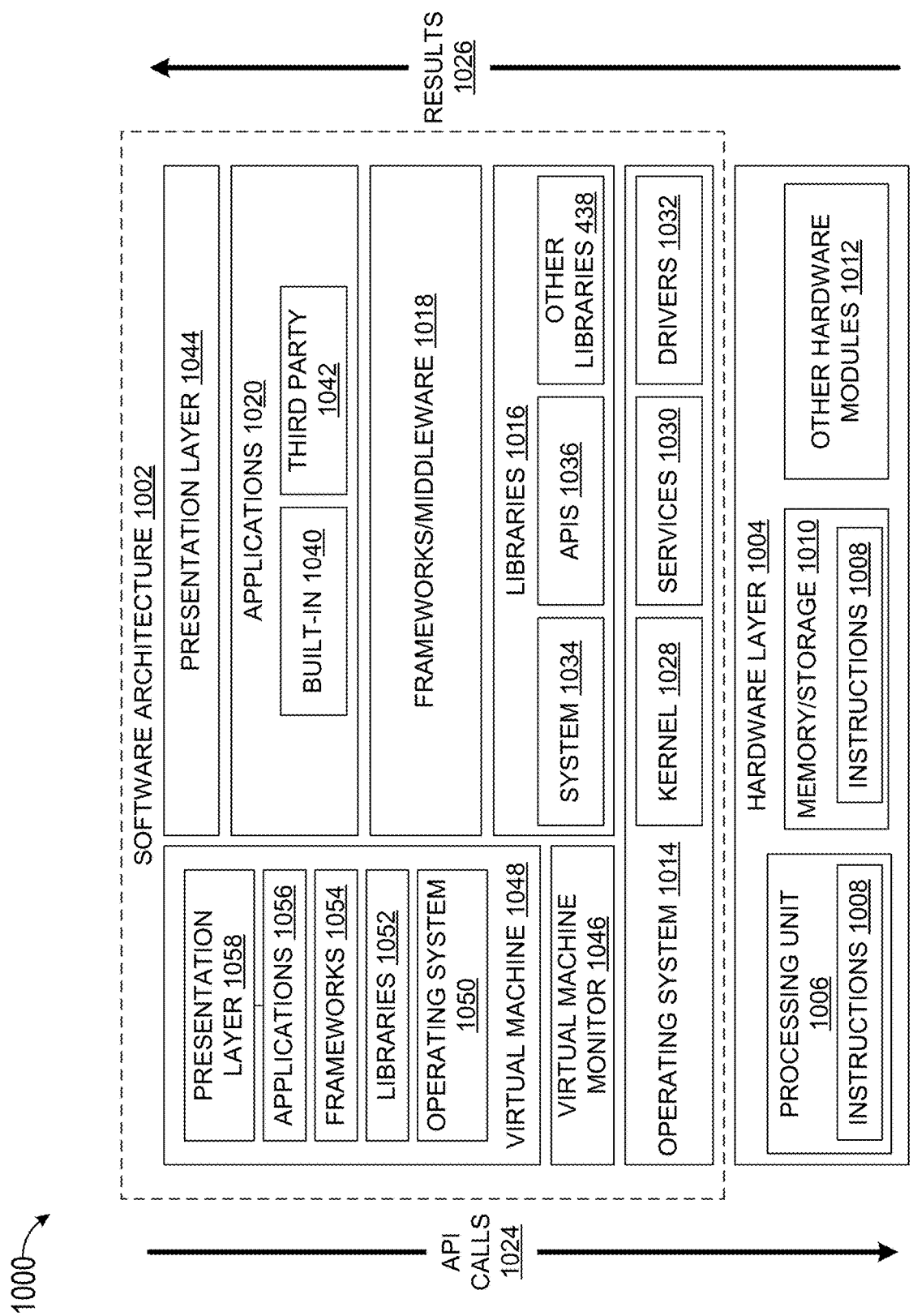
FIG. 10 is a block diagram illustrating an example software architecture, various portions of which may be used in conjunction with various hardware architectures herein described, which may implement any of the features herein described.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1110, memory 1130, and input/output (I/O) components 1150. A representative hardware layer 1004 is illustrated and can represent, for example, the machine 1100 of FIG. 11. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1008 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services.

The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1014, libraries 1072, frameworks 1054, applications 1056, and/or a presentation layer 1058.

Figure 11:
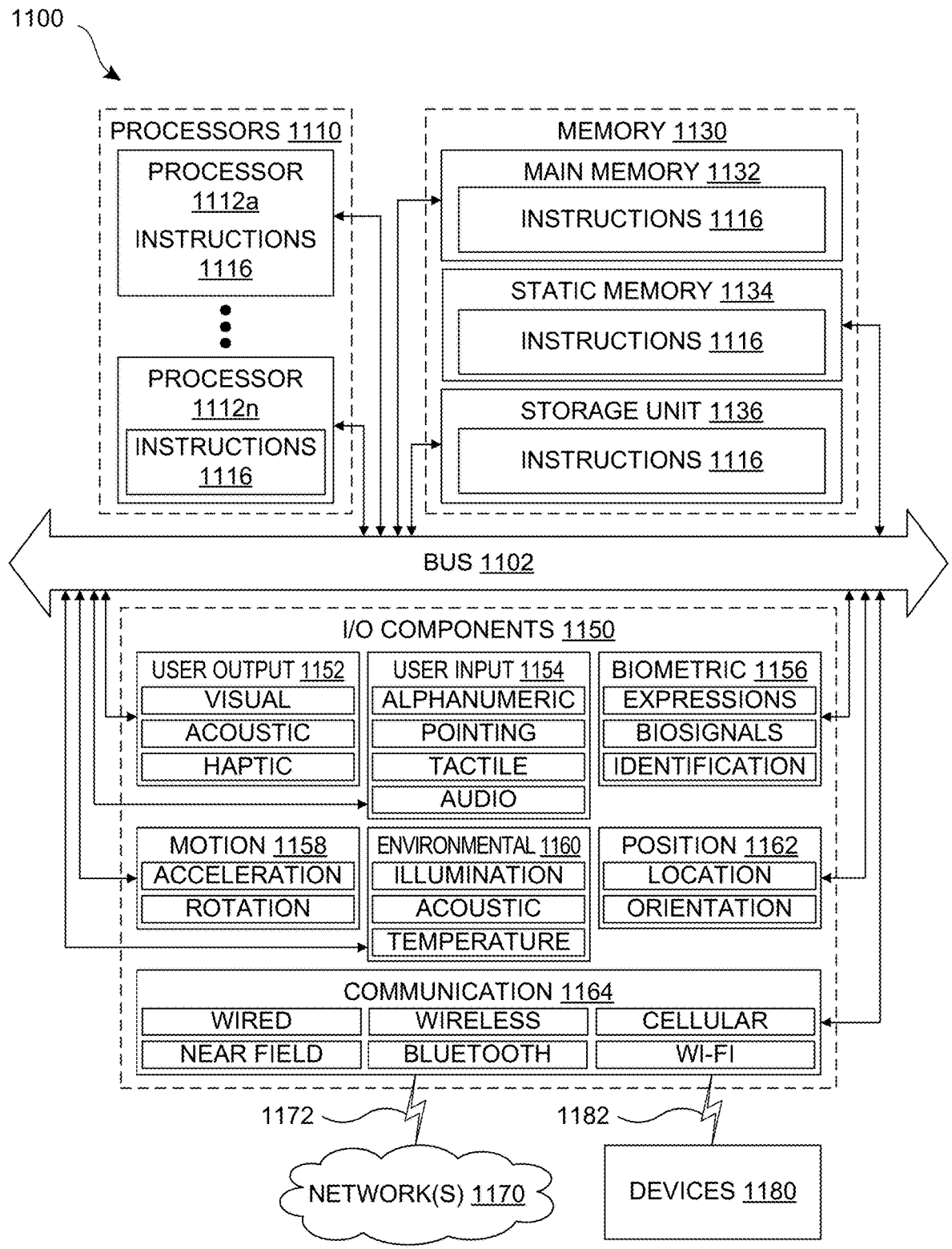
FIG. 11 is a block diagram illustrating components of an example machine configured to read instructions from a machine-readable medium and perform any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

In the following, further features, characteristics and advantages of the system and method will be described by means of items: Item 1. A data processing system comprising: a processor; and a computer-readable medium. The medium storing executable instructions for causing the processor to perform operations comprising: obtaining training data for a machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

Item 2. The data processing system of claim 1, wherein to process the training data comprising the outlier data elements further includes instructions to cause the processor to perform the operations comprising: generating a report presenting the outlier data elements of the plurality of data elements of the training data.

Item 3. The method of claim 1, wherein processing the training data comprising the outlier data elements further comprises: deleting at least a portion of the training data comprising the outlier date elements.

Item 4. The data processing system of item 1, further comprising instructions for causing the processor to perform operations comprising: analyzing historical textual data comprising textual content indicative commonly used language associated with a domain for which the machine learning model is to be used; and generating the embedding data by analyzing relationships between words, phrases, or both included in the historical textual data.

Item 5. The data processing system of item 4, wherein the historical textual data comprises one or more of text messages, emails, and transcripts of audio communications.

Item 6. The data processing system of item 4, wherein generating the embedding data further comprises: generating a mapping of words, phrases, or both from the historical textual data to numerical vectors, each numerical vector representing a respective one of the words, phrases, or both, and each numerical vector comprising numerical values representing relationships between words, phrases, or both in the historical textual data.

Item 7. The data processing system of item 4, wherein the instructions for determining the in-label similarities further comprise instructions configured to cause the processor to perform the operations of: selecting a first data element from the training data associated with a first label; selecting a first set of one or more other data elements associated with the first label; and determining a first set of cross-determination data representing similarities between the first data element and each of the data elements of the first set of one or more data elements.

Item 8. The data processing system of item 7, further comprising instructions for causing the processor to perform the operations of: selecting a second set of one or more data elements associated with one or more labels that are different than the first label; and generating a second set of cross-determination data representing similarities between the first data element and each of the data elements of the first set of one or more data elements.

Item 9. The data processing system of item 8, further comprising instructions for causing the processor to perform operations comprising: determining whether the first data element is an outlier data element associated with an incorrect label based on the first set of cross-determination data and the second set of cross-determination data.

Item 10. The data processing system of item 1, wherein the SNN comprises a Bidirectional Long Short-Term Memory (BiLSTM) neural network.

Item 11. A method performed by a data processing system for analyzing training data for a machine learning model, the method comprising: obtaining the training data for the machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

Item 12. The method of item 11, wherein processing the training data comprising the outlier data elements further comprises at least one of: generating a report presenting the outlier data elements of the plurality of data elements of the training data; and deleting at least a portion of the training data comprising the outlier date elements.

Item 13. The method of item 11, further comprising: analyzing historical textual data comprising textual content indicative commonly used language associated with a domain for which the machine learning model is to be used; and generating the embedding data by analyzing relationships between words, phrases, or both included in the historical textual data.

Item 14. The method of item 11, wherein determining the in-label similarities further comprises: selecting a first data element from the training data associated with a first label; selecting a first set of one or more other data elements associated with the first label; and determining a first set of cross-determination data representing similarities between the first data element and each of the data elements of the first set of one or more data elements.

Item 15. The method of item 11, further comprising: selecting a second set of one or more data elements associated with one or more labels that are different from the first label; and generating a second set of cross-determination data representing similarities between the selected data element and each of the data elements of the first set of one or more data elements.

Item 16. The method of item 15, further comprising: determining whether the first data element is an outlier data element associated with an incorrect label based on the first set of cross-determination data and the second set of cross-determination data.

Item 17. The method of item 11, wherein the SNN comprises a Bidirectional Long Short-Term Memory (BiLSTM) neural network.

Item 18. A memory device storing instructions that, when executed on a processor of a data processing system, cause the data processing system to analyze training data for a machine learning model, by: obtaining the training data for a machine learning model from a memory of the data processing system; analyzing the training data using a Siamese Neural Network to determine within-label similarities and cross-label similarities associated with a plurality of data elements within the training data, the within-label representing similarities between a respective data element and a first set of data elements similarly labeled in the training data, the cross-label similarities representing similarities between the respective data element and a second set of data elements dissimilarly labeled in the training data; identifying outlier data elements in the plurality of data elements based on the within-label and cross-label similarities; and processing the training data comprising the outlier data elements.

Item 19. The memory device of item 18, wherein to process the training data comprising the outlier data elements further includes instructions to cause the processor to perform the operations comprising: generating a report presenting the outlier data elements of the plurality of data elements of the training data; and deleting at least a portion of the training data comprising the outlier date elements.

Item 20. The memory device of item 18, further comprising instructions for causing the processor to perform operations comprising: analyzing historical textual data comprising textual content indicative commonly used language associated with a domain for which the machine learning model is to be used; and generating the embedding data by analyzing relationships between words, phrases, or both included in the historical textual data.

Item 21. The memory device of item 18, wherein the instructions for determining the in-label similarities further comprise instructions configured to cause the processor to perform the operations of: selecting a first data element from the training data associated with a first label; selecting a first set of one or more other data elements associated with the first label; and determining a first set of cross-determination data representing similarities between the first data element and each of the data elements of the first set of one or more data elements.

Item 22. The memory device of item 21, further comprising instructions for causing the processor to perform operations comprising: selecting a second set of one or more data elements associated with one or more labels that are different from the first label; and generating a second set of cross-determination data representing similarities between the selected data element and each of the data elements of the first set of one or more data elements.

Item 23. The memory device of item 21, further comprising instructions for causing the processor to perform operations comprising: determining whether the first data element is an outlier data element associated with an incorrect label based on the first set of cross-determination data and the second set of cross-determination data.

Item 24. The memory device of item 18, wherein the SNN comprises a Bidirectional Long Short-Term Memory (BiLSTM) neural network.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a computer-readable medium storing executable instructions for causing the processor to perform operations comprising:
obtaining training data for a machine learning model from a memory of the data processing system;
analyzing the training data using a Siamese Neural Network to determine within-label similarities and cross-label similarities associated with a plurality of data elements within the training data, the within-label similarities representing similarities between a selected data element and a first set of data elements similarly labeled in the training data with a first label, the cross-label similarities representing similarities between the selected data element and a second set of data elements dissimilarly labeled in the training data with one or more second labels different from the first label, wherein
determining the within-label similarities includes:
selecting the first set of data elements from the training data labeled with the first label, and
determining first cross-determination data representing similarities between the selected data element and each data element of the first set of data elements;
determining the cross-label similarities includes:
selecting the second set of data elements from the training data associated with the one or more second labels, and
determining second-cross determination data representing similarities between the selected data element and each data element of the second set of data elements; and
identifying outlier data elements in the plurality of data elements based on the within-label and cross-label similarities by comparing the first cross-determination data and the second cross-determination data; and
processing the training data comprising the outlier data elements.

2. The data processing system of claim 1, wherein to process the training data comprising the outlier data elements further includes instructions to cause the processor to perform the operations comprising:
generating a report presenting the outlier data elements of the plurality of data elements of the training data.

3. The data processing system of claim 1, wherein processing the training data comprising the outlier data elements further comprises:
deleting at least a portion of the training data comprising the outlier data elements.

4. The data processing system of claim 1, further comprising instructions for causing the processor to perform operations comprising:
analyzing historical textual data comprising textual content indicative commonly used language associated with a domain for which the machine learning model is to be used; and
generating embedding data by analyzing relationships between words, phrases, or both included in the historical textual data.

5. The data processing system of claim 4, wherein the historical textual data comprises one or more of text messages, emails, and transcripts of audio communications.

6. The data processing system of claim 4, wherein generating the embedding data further comprises:
generating a mapping of words, phrases, or both from the historical textual data to numerical vectors, each numerical vector representing a respective one of the words, phrases, or both, and each numerical vector comprising numerical values representing relationships between words, phrases, or both in the historical textual data.

7. The data processing system of claim 1, wherein the Siamese Neural Network comprises a Bidirectional Long Short-Term Memory (BiLSTM) recurrent neural network.

8. A method performed by a data processing system for analyzing training data for a machine learning model, the method comprising:
obtaining the training data for the machine learning model from a memory of the data processing system;
analyzing the training data using a Siamese Neural Network to determine within-label similarities and cross-label similarities associated with a plurality of data elements within the training data, the within-label representing similarities between a selected data element and a first set of data elements similarly labeled in the training data with a first label, the cross-label similarities representing similarities between the selected data element and a second set of data elements dissimilarly labeled in the training data with one or more second labels different from the first label, wherein
determining the within-label similarities includes:
selecting the first set of data elements from the training data labeled with the first label, and
determining first cross-determination data representing similarities between the selected data element and each data element of the first set of data elements;
determining the cross-label similarities includes:
selecting the second set of data elements from the training data associated with the one or more second labels, and
determining second cross-determination data representing similarities between the selected data element and each data element of the second set of data elements; and
identifying outlier data elements in the plurality of data elements based on the within-label and cross-label similarities by comparing the first cross-determination data and the second cross-determination data; and
processing the training data comprising the outlier data elements.

9. The method of claim 8, wherein processing the training data comprising the outlier data elements further comprises at least one of:
generating a report presenting the outlier data elements of the plurality of data elements of the training data; and
deleting at least a portion of the training data comprising the outlier data elements.

10. The method of claim 8, further comprising:
analyzing historical textual data comprising textual content indicative commonly used language associated with a domain for which the machine learning model is to be used; and generating embedding data by analyzing relationships between words, phrases, or both included in the historical textual data.

11. A memory device storing instructions that, when executed on a processor of a data processing system, cause the data processing system to analyze training data for a machine learning model, by:

obtaining the training data for the machine learning model from a memory of the data processing system;

analyzing the training data using a Siamese Neural Network to determine within-label similarities and cross-label similarities associated with a plurality of data elements within the training data, the within-label similarities representing similarities between a selected data element and a first set of data elements similarly labeled in the training data with a first label, the cross-label similarities representing similarities between the selected data element and a second set of data elements dissimilarly labeled in the training data with one or more second labels different from the first label, wherein determining the within-label similarities includes:
selecting the first set of data elements from the training data labeled with the first label, and
determining first-cross determination data representing similarities between the selected data element and each data element of the first set of data elements; and determining the cross-label similarities includes:
selecting the second set of data elements from the training data associated with the one or more second labels, and
determining second-cross determination data representing similarities between the selected data element and each data element of the second set of data elements;

identifying outlier data elements in the plurality of data elements based on the within-label and cross-label similarities; and processing the training data comprising the outlier data elements.

12. The memory device of claim 11, wherein to process the training data comprising the outlier data elements further includes instructions to cause the processor to perform operations comprising:

generating a report presenting the outlier data elements of the plurality of data elements of the training data; and deleting at least a portion of the training data comprising the outlier data elements.

13. The memory device of claim 11, further comprising instructions for causing the processor to perform operations comprising:

analyzing historical textual data comprising textual content indicative commonly used language associated with a domain for which the machine learning model is to be used; and generating embedding data by analyzing relationships between words, phrases, or both included in the historical textual data.

* * * * *